US009999931B2

(12) United States Patent
Motschi et al.

(10) Patent No.: US 9,999,931 B2
(45) Date of Patent: Jun. 19, 2018

(54) LOCKING MECHANISM FOR A COLLET ASSEMBLY

(71) Applicant: SCHAUBLIN SA, Delemont (CH)

(72) Inventors: René Motschi, Oberbuchsiten (CH); Jean-Gabriel Theubet, Porrentruy (CH)

(73) Assignee: SCHAUBLIN SA, Delemont (CH)

(*) Notice: Subject to any disclaimer, the term of this patent is extended or adjusted under 35 U.S.C. 154(b) by 36 days.

(21) Appl. No.: 14/894,725

(22) PCT Filed: May 30, 2013

(86) PCT No.: PCT/EP2013/061182
§ 371 (c)(1),
(2) Date: Nov. 30, 2015

(87) PCT Pub. No.: WO2014/191042
PCT Pub. Date: Dec. 4, 2014

(65) Prior Publication Data
US 2016/0107243 A1 Apr. 21, 2016

(51) Int. Cl.
B23B 31/20 (2006.01)
F16D 1/116 (2006.01)
F16D 7/10 (2006.01)

(52) U.S. Cl.
CPC ............ *B23B 31/20* (2013.01); *B23B 31/207* (2013.01); *B23B 2231/2005* (2013.01);
(Continued)

(58) Field of Classification Search
CPC ................. B23B 31/20; B23B 31/207; B23B 2231/2078; B23B 2270/06;
(Continued)

(56) References Cited

U.S. PATENT DOCUMENTS 1,973,943 A 9/1934 Buhr
2,441,644 A 5/1948 Mueller
(Continued)

FOREIGN PATENT DOCUMENTS

DE 1625670 A1 * 8/1970 ............... F16D 7/10
EP 111625 A2 6/1984
(Continued)

OTHER PUBLICATIONS

Notification of Reasons for Rejection issued in corresponding Japanese Application No. JP 2016-515666 dated Dec. 6, 2016, pp. 1-5.

*Primary Examiner* — Daniel Howell
*Assistant Examiner* — Paul M Janeski
(74) *Attorney, Agent, or Firm* — Murtha Cullina LLP

(57) ABSTRACT

A locking mechanism includes a biasing ring having a first area having a first radial thickness and a first radially inward facing surface and a second area having a second radial thickness and a second radially inward facing surface. The locking mechanism includes an inner ring having an activation tab extending therefrom and defining a radially outward facing surface. The biasing ring is positioned around the inner ring thereby defining a cavity between the biasing ring and the inner ring. The locking mechanism includes a detent member positioned in the cavity and selectively engageable with at least one of the first radially inward facing surface, the second inwardly facing surface and the radially outward facing surface.

16 Claims, 10 Drawing Sheets

(52) U.S. Cl.
CPC . *B23B 2231/2078* (2013.01); *B23B 2260/022* (2013.01); *B23B 2260/078* (2013.01); *B23B 2270/06* (2013.01); *F16D 1/116* (2013.01); *F16D 7/10* (2013.01)

(58) Field of Classification Search
CPC ...... B23B 2260/022; B23B 2231/2005; B23B 2260/078; B23B 31/201; B23B 31/208; B23B 2231/2081; F16D 7/10; F16D 1/116; Y10T 279/17529
See application file for complete search history.

(56) References Cited

U.S. PATENT DOCUMENTS

| | | | |
|---|---|---|---|
| 2,508,731 A * | 5/1950 | Stoner | B23B 31/202 279/47 |
| 2,574,754 A | 11/1951 | Peters | |
| 2,735,686 A * | 2/1956 | Cox | B23B 31/201 279/50 |
| 2,926,020 A * | 2/1960 | Dayton | B23B 31/1071 279/22 |
| 2,990,188 A | 6/1961 | Better et al. | |
| 3,405,950 A | 10/1968 | Cox | |
| 3,816,015 A | 6/1974 | Bilz et al. | |
| 3,822,951 A | 7/1974 | Bornzin | |
| 3,841,645 A | 10/1974 | Parsons | |
| 3,947,047 A | 3/1976 | Hultman | |
| 4,023,815 A | 5/1977 | Dunham | |
| 4,171,820 A | 10/1979 | Klancnik | |
| 4,171,821 A | 10/1979 | Miller | |
| 4,441,563 A | 4/1984 | Walton, II | |
| 4,456,271 A | 6/1984 | Kern et al. | |
| 4,736,659 A | 4/1988 | Erickson | |
| 4,960,344 A | 10/1990 | Geisthoff et al. | |
| 5,234,296 A | 8/1993 | Presby et al. | |
| 5,431,416 A | 7/1995 | Thornton | |
| 5,664,467 A | 9/1997 | Breeze | |
| 5,752,424 A | 5/1998 | Rosene et al. | |
| 5,806,859 A | 9/1998 | Saccomanno, III | |
| 6,170,232 B1 | 1/2001 | VandeGeijn | |
| 6,257,595 B1 | 7/2001 | Difasi et al. | |
| 6,588,993 B2 | 7/2003 | Omi | |
| 6,854,741 B2 | 2/2005 | Lopez | |
| 6,966,730 B1 | 11/2005 | Miyanaga | |
| 2002/0006310 A1 | 1/2002 | Hauptmann et al. | |
| 2003/0184028 A1 | 10/2003 | Schlotterer | |
| 2007/0054239 A1 | 3/2007 | Maitre | |
| 2008/0280709 A1 | 11/2008 | Gouadec | |
| 2013/0076028 A1 | 3/2013 | Pallini, Jr. et al. | |

FOREIGN PATENT DOCUMENTS

| | | | |
|---|---|---|---|
| EP | 1675523 | | 9/2005 |
| JP | H11511699 A | | 10/1999 |
| JP | 2000170788 A | | 6/2000 |
| JP | 2002178933 A | | 6/2002 |
| JP | 2002257153 A | * | 9/2002 |
| WO | 8807904 A1 | | 10/1988 |
| WO | 9748513 A1 | | 12/1997 |
| WO | 2006025166 A1 | | 3/2006 |

* cited by examiner

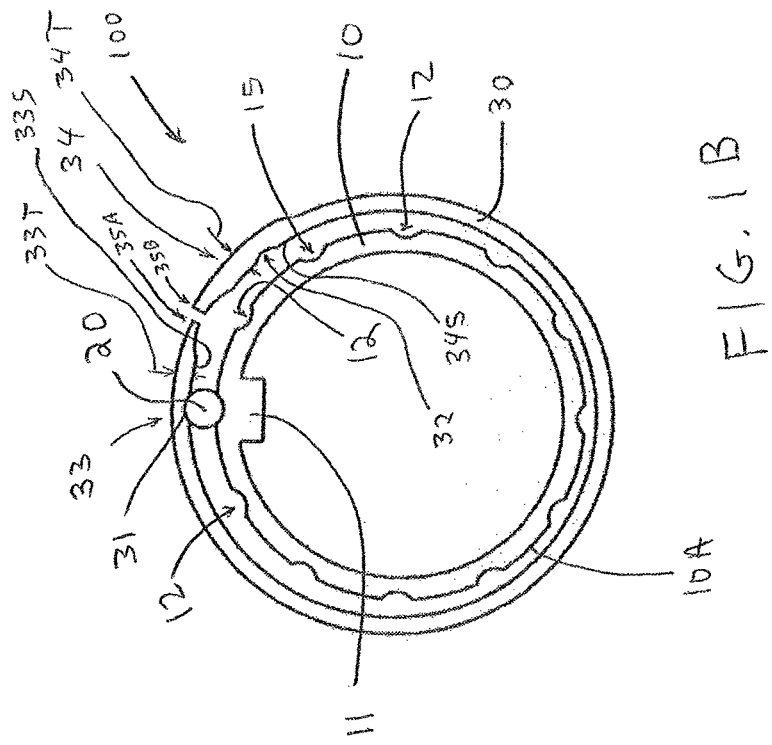
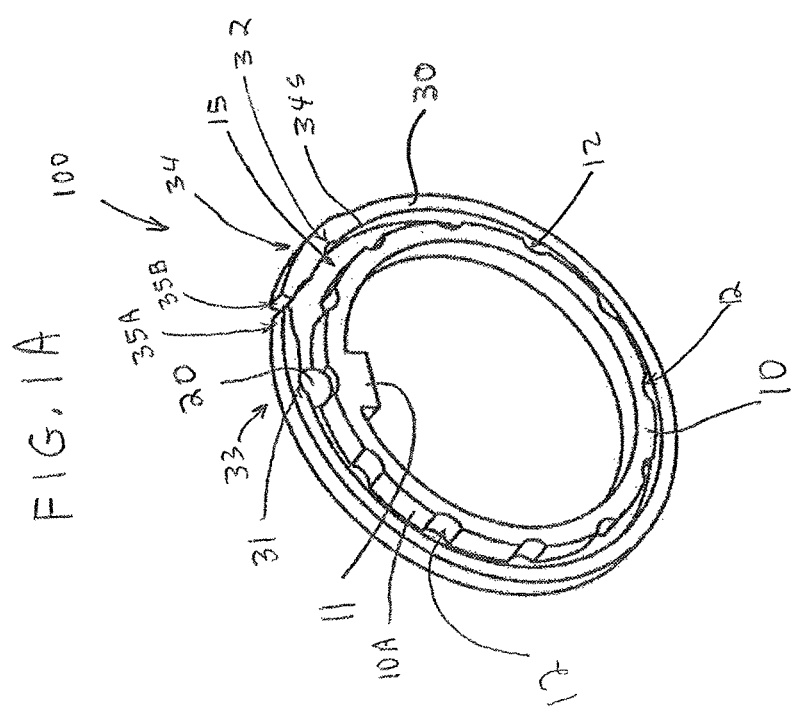

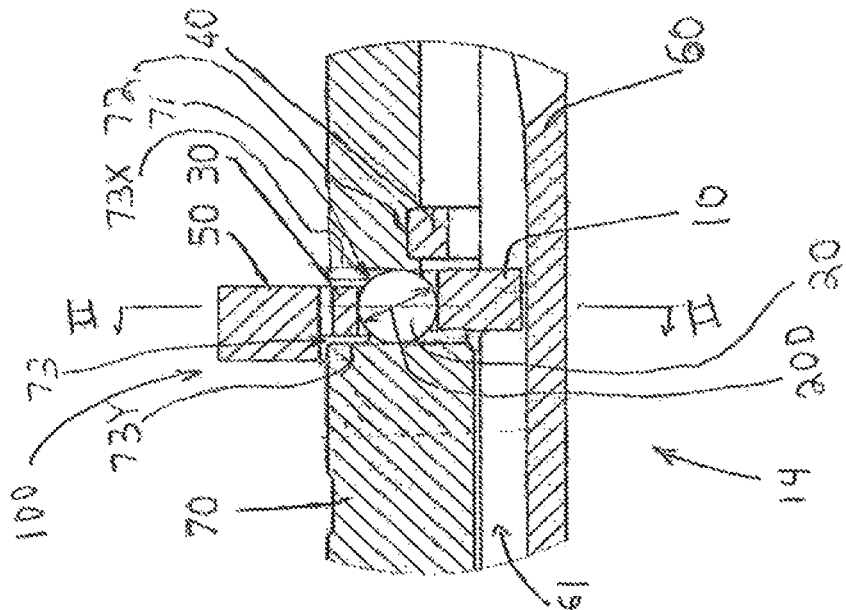
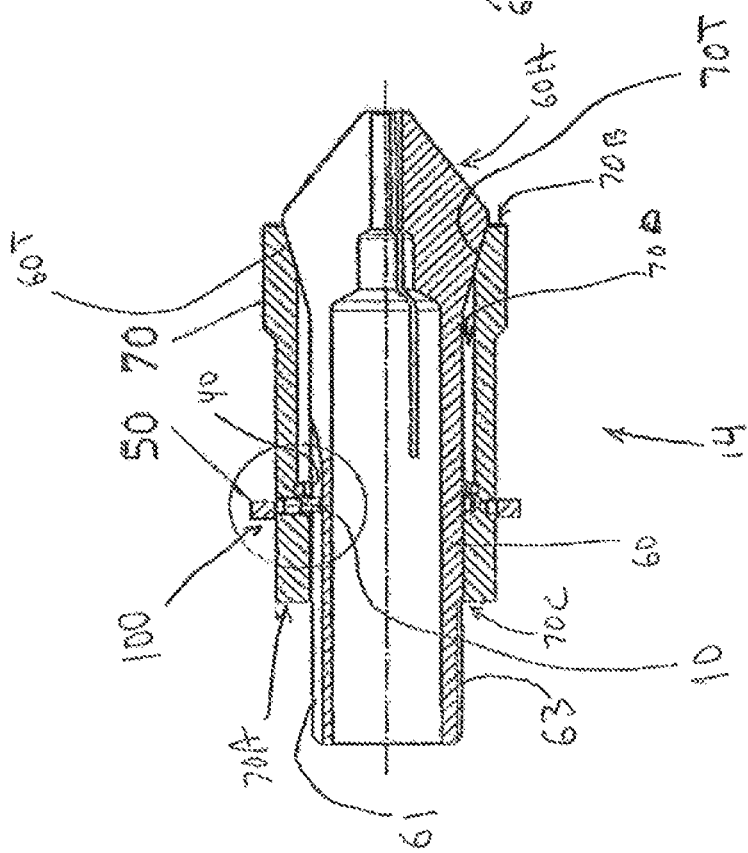

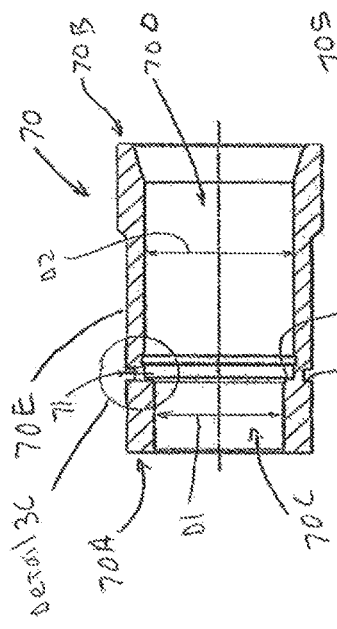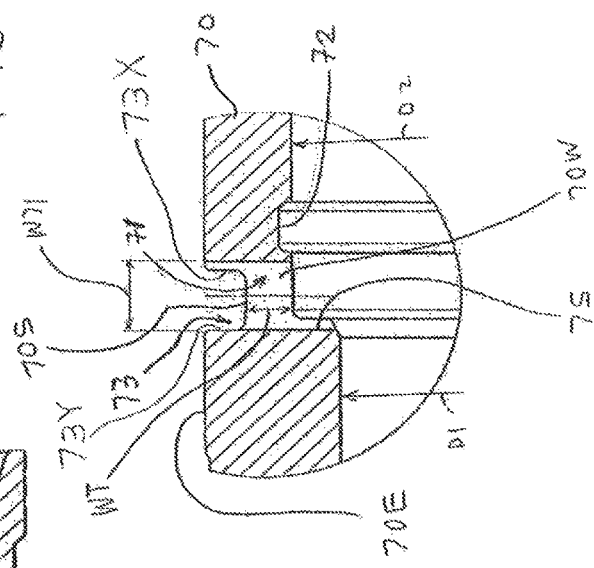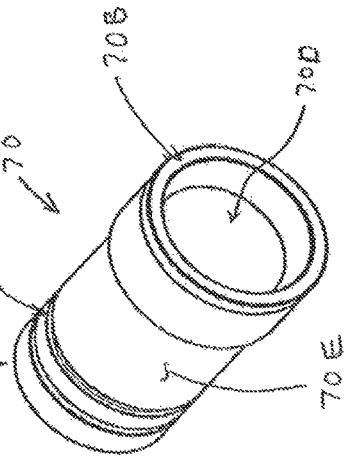

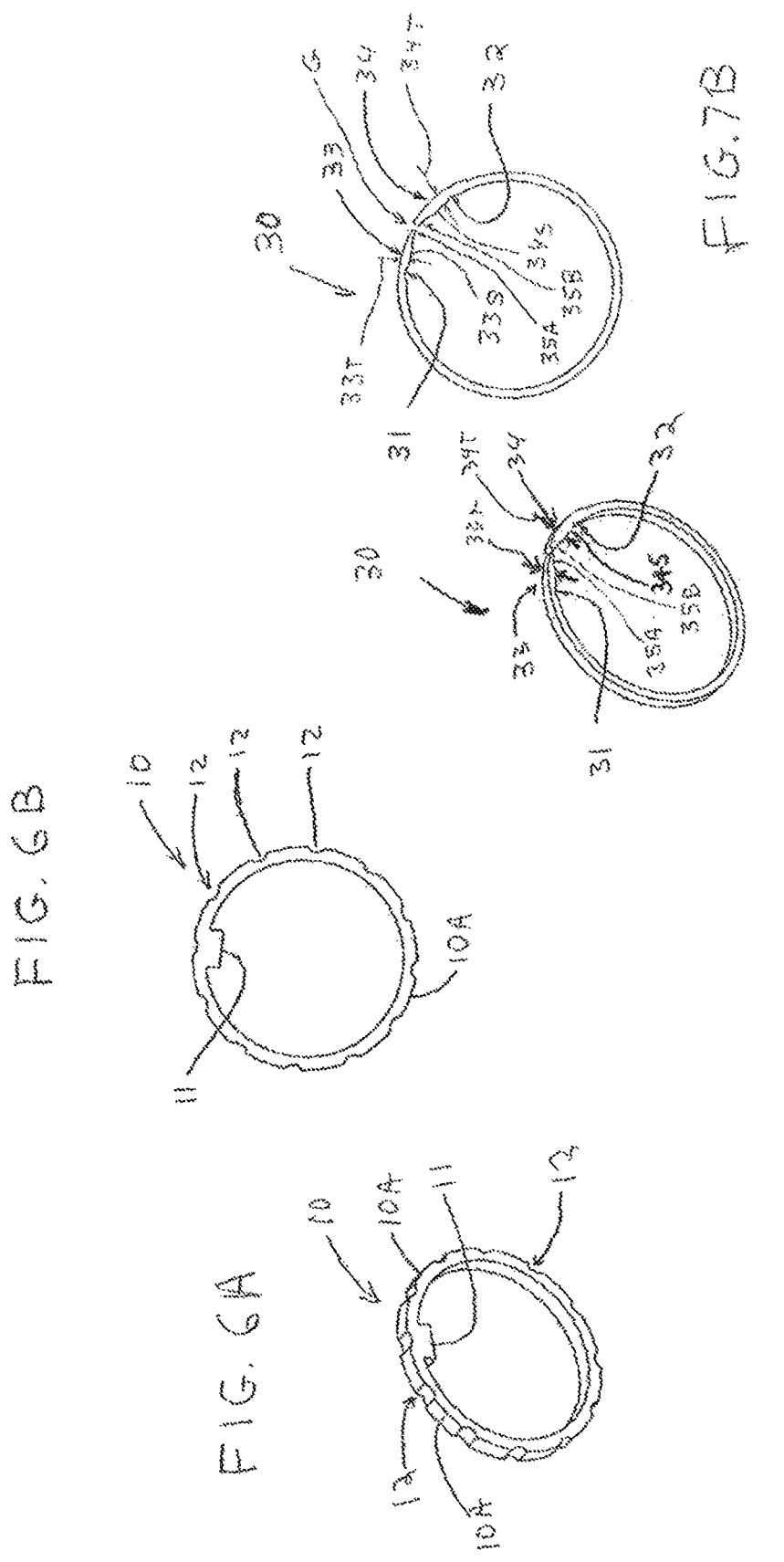

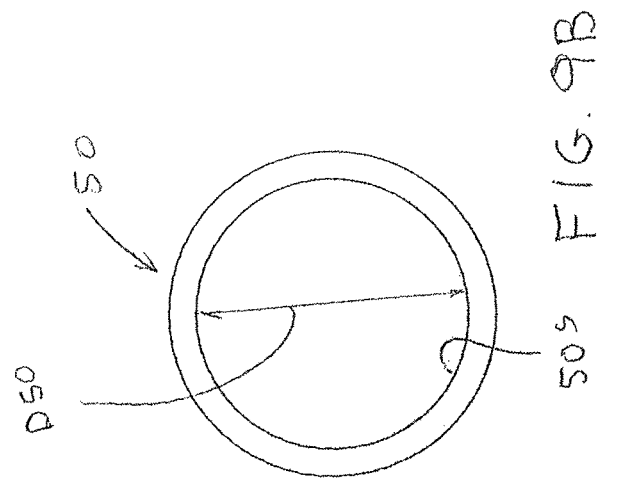
FIG. 9B
FIG. 9A
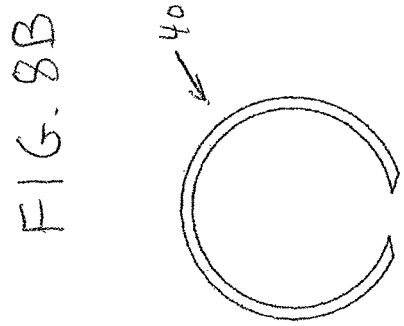
FIG. 8B
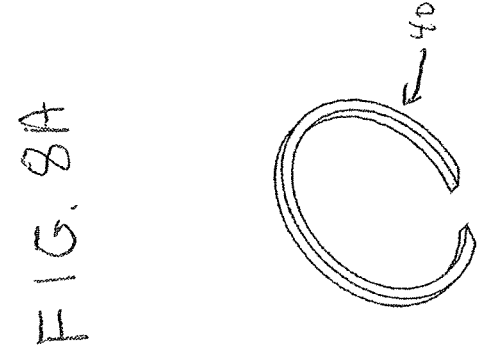
FIG. 8A

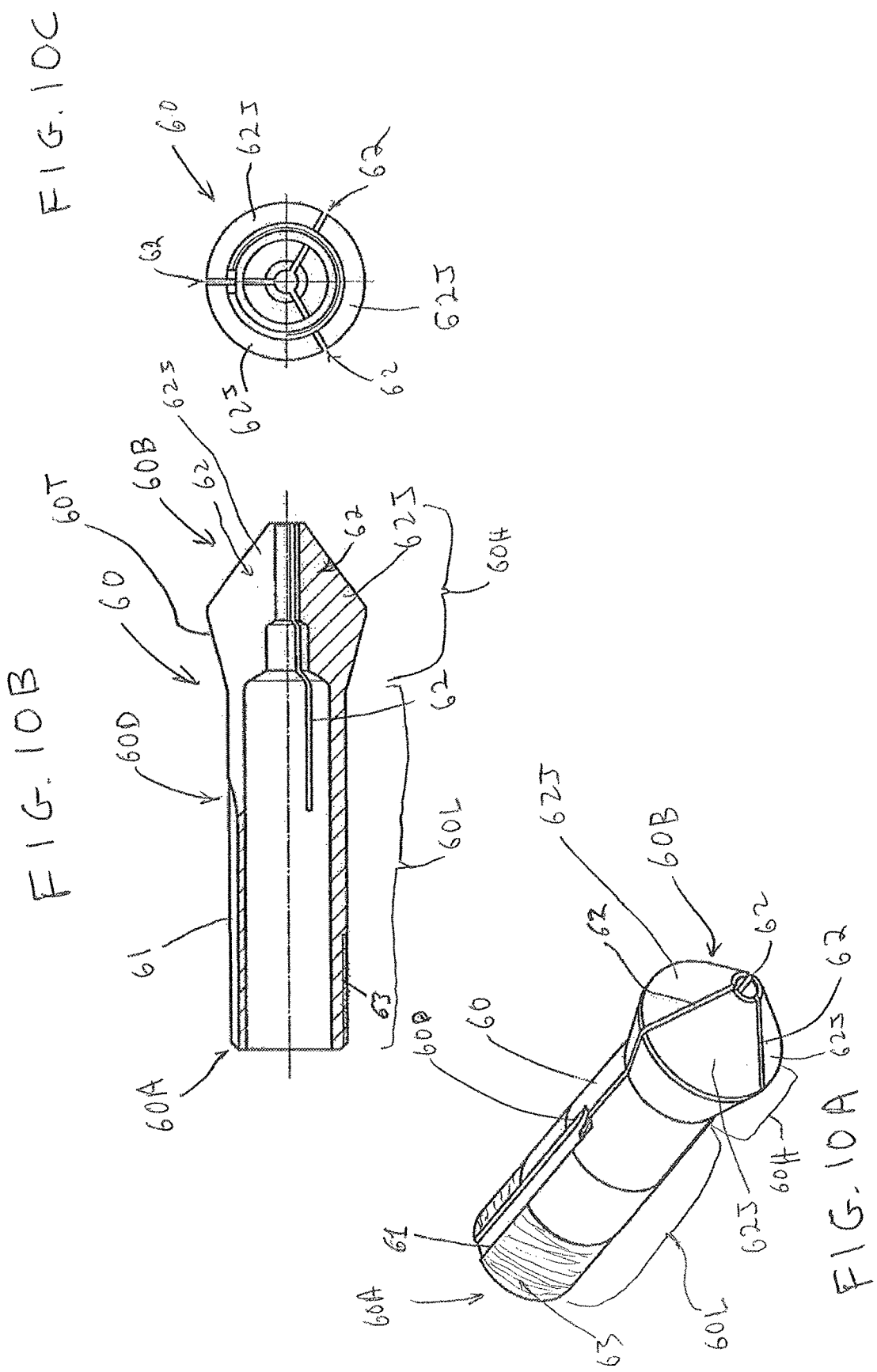

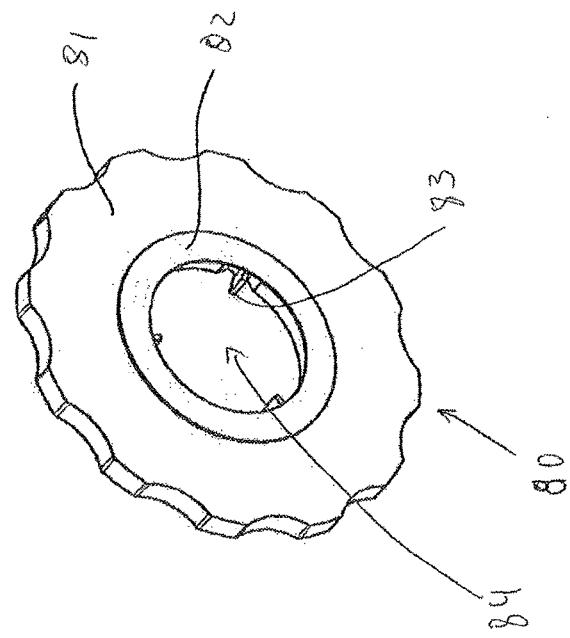
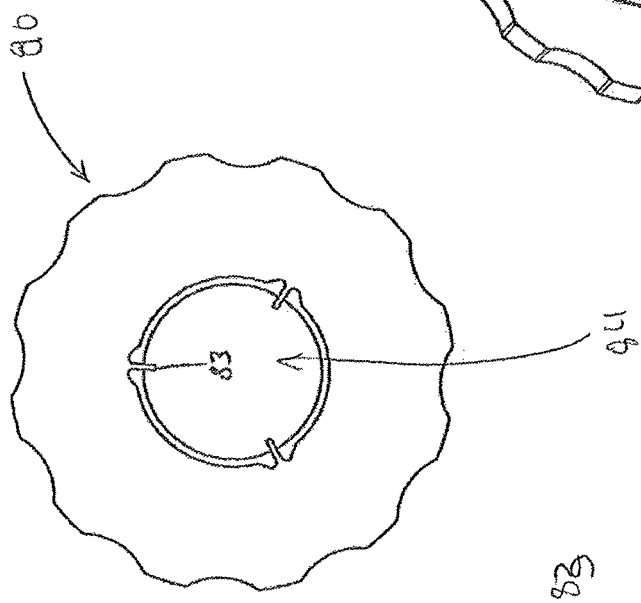
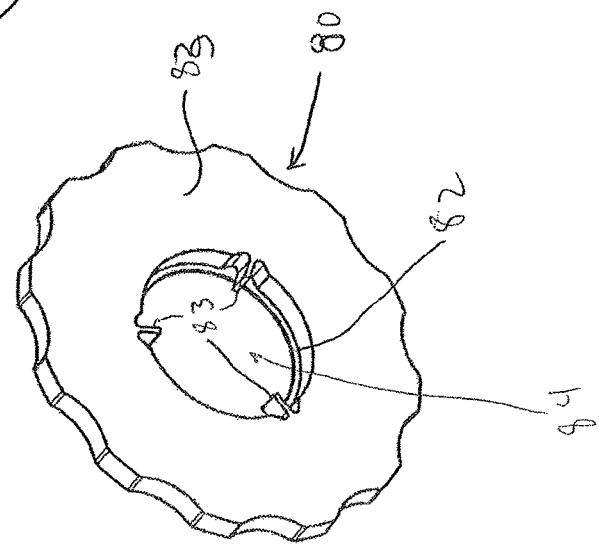

LOCKING MECHANISM FOR A COLLET ASSEMBLY

FIELD OF THE INVENTION

The present invention relates generally to collets and other clamping tools, such as but not limited to, expanding arbors, tool holders of various types, clamping systems, whether manual or automated, and more particularly to a locking mechanism configured for use with a collet assembly to enable assembly of the collet to a system from the front of the system and enabling predetermined positioning of the collet.

BACKGROUND

A collet is a device having two or more "jaws" between which an object such as a tool or a work piece can be positioned. The jaws form a collar around the object. The jaws of the collet are configured to constrict around the object and exert a clamping force thereto. The geometrical shape of the inner bore formed of the jaws can be round, square, hexagonal or any other specific shape as may be required. Collets are typically fabricated from spring steel, which allows the jaws to be sufficiently flexible relative to each other to facilitate the constriction of the tool or work piece.

The collet is held in a clamping device, which is connected to a shaft. In some cases, the shaft and collet can be rotated, which in turn causes the tool or the work piece mounted therein to rotate. In some other cases the collet needs to be secured in a fixed position, preventing a rotation. In instances in which a tool is clamped in the collet and rotated, the tool is made to engage or be engaged by a work piece. In instances in which the work piece is clamped in the collet and rotated, the work piece engages or is engaged by a tool. The rotational accuracy and the positioning of the tool or the work piece affect the process of removing swarf from the work piece. Set up and preparing the machines for the work process can be complicated and time consuming.

SUMMARY

According to aspects illustrated herein there is provided a locking mechanism including a biasing ring having a first area with a first radial thickness and a first radially inward facing surface; and a second area with a second radial thickness and a second radially inward facing surface. The locking mechanism includes an inner ring having an activation tab extending therefrom and defining a radially outward facing surface. The biasing ring is positioned around the inner ring thereby defining a cavity therebetween. The locking mechanism includes a detent member positioned in the cavity and selectively engageable with at least one of the first radially inward facing surface, the second inwardly facing surface and the radially outward facing surface.

According to other aspects illustrated herein there is provided a collet assembly including a collet adapter having a first circumferential groove formed in an exterior surface defined by the collet adapter. The first circumferential groove has a hole extending axially therethrough. The collet assembly includes a biasing ring positioned in the first circumferential groove. The biasing ring has a first area having a first radial thickness and a second area having a second radial thickness. A first notch is formed on a first radially inward facing surface defined by the first area and a second notch is formed on a second radially inward facing surface defined by the second area. The collet assembly includes an inner ring having an activation tab extending therefrom and at least one third notch formed in a radially outward facing surface defined by the inner ring. The biasing ring is positioned around the inner ring thereby defining a cavity therebetween. A portion of the collet adapter is positioned in the cavity. A detent member, for example one or more balls or pins, is positioned in the cavity and partially in the hole. The detent member is selectively engageable with at least one of the first notch, the second notch and the at least one third notch.

DESCRIPTION OF THE DRAWINGS

FIG. 1A is a perspective view of a locking mechanism, in accordance with one embodiment of the present invention;

FIG. 1B is a front view of the locking mechanism of FIG. 1A;

FIG. 2A is a side cross sectional view of the locking mechanism of FIG. 1A installed in collet assembly;

FIG. 2B is an enlarged cross sectional view of a portion of the collet assembly of FIG. 2A showing details of the locking mechanism therein;

FIG. 3A is a perspective view of a collet adapter portion of the collet assembly of FIG. 2A;

FIG. 3B is a side cross sectional view of the collet adapter of FIG. 3A;

FIG. 3C is an enlarged view of a grooved portion of the collet adapter of FIG. 3A;

FIG. 6A is a perspective view of an inner ring of the locking mechanism of FIG. 1A;

FIG. 6B is a front view of the inner ring of FIG. 6A;

FIG. 7A is a perspective view of a biasing ring of the locking mechanism of FIG. 1A;

FIG. 7B is a front view of the biasing ring of FIG. 7A;

FIG. 8A is a perspective view of a split ring of the collet assembly of FIG. 2A;

FIG. 8B is a front view of the split ring of FIG. 8A;

FIG. 9A is a perspective view of a lock ring of the collet assembly of FIG. 2A;

FIG. 9B is a front view of the lock ring of FIG. 9A;

FIG. 10A is a perspective view of a collet for use with the collet assembly of FIG. 2A;

FIG. 10B is a side cross sectional view of the collet of FIG. 10A;

FIG. 10C is a rear end view of the collet of FIG. 10A;

FIG. 11A is a rear perspective view of the set-key of FIG. 4;

FIG. 11B is a rear end view of the set-key of FIG. 11A;

FIG. 11C is a front perspective view of the set-key of FIG. 11A.

DETAILED DESCRIPTION OF THE INVENTION

Figure 2C:
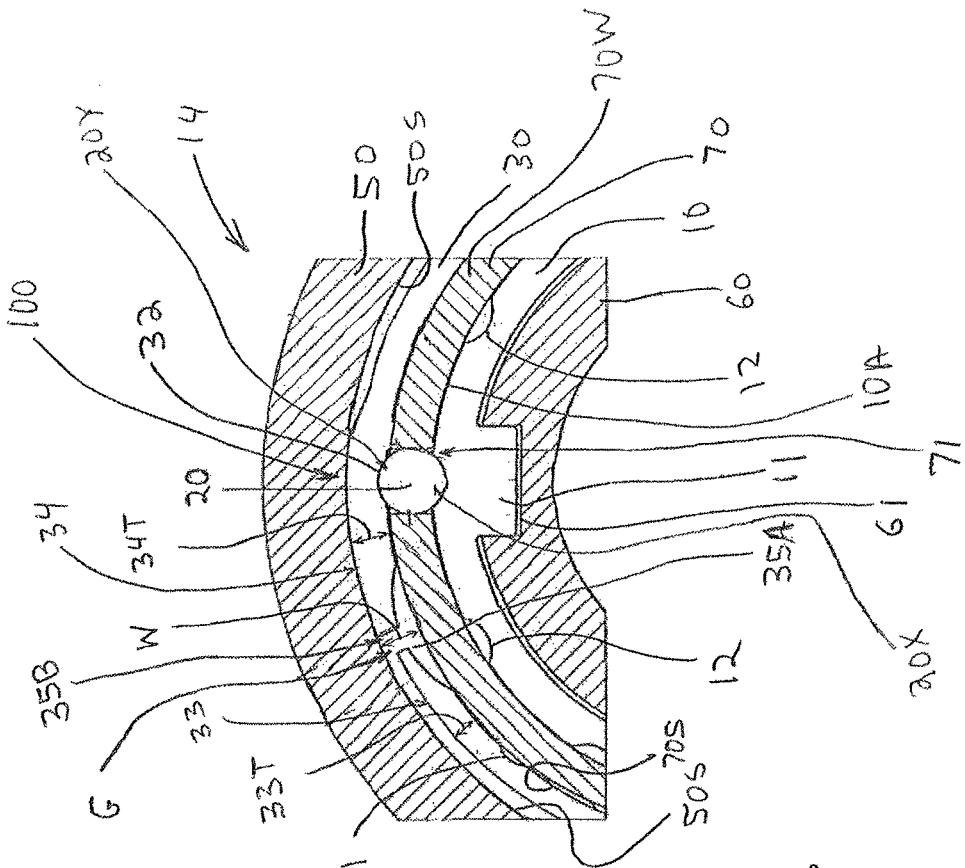
FIG. 2C is a cross sectional view of the collet assembly and locking mechanism of FIG. 2B shown in an unlocked position and taken across line II-II of FIG. 2B.

In reference to FIGS. 1A and 1B, 6A, 6B, 7A, 7B a locking mechanism is generally designated by the numeral 100. The locking mechanism 100 has utility in numerous machines and structures including, but not limited to use in a collet assembly 14 to maintain a collet 60 in a collet adapter 70, as described further herein with reference to FIGS. 2A and 2B. The locking mechanism 100 includes an inner ring 10, for example a key ring as illustrated in FIGS. 1A, 1B, 6A and 6B. The locking mechanism 100 includes an outer ring for example a biasing ring 30, as illustrated in FIGS. 1A, 1B, 7A and 7B. The biasing ring 30 is positioned around the inner ring 10 thereby defining a generally annular cavity 15 therebetween. A detent member 20, for example a ball is positioned in the cavity 15. The ball 20 has a diameter 20D.

Referring to FIGS. 1A, 1B, 6A and 6B, the inner ring 10 has an activation tab 11 extending radially inward therefrom. The inner ring 10 defines a radially outward facing surface 10A. The radially outward facing surface 10A is shown, for example, having twelve arcuate notches 12 (e.g., circular shaped notches) circumferentially equally spaced thereon. Each of the notches 12 extend radially inward at a respective circumferential position along the radially outward facing surface. Adjacent ones of the notches 12 are circumferentially spaced apart from one another. While the notches 12 and shown and described as be arcuate and equally spaced, the present invention is not limited in this regard as the notches may be of any shape (e.g., elliptical, triangular, square or rectangular) and may be asymmetrically spaced on the radially outward facing surface 10A, having a plurality of notches, but at least one.

Referring to FIGS. 1A, 1B, 7A and 7B, the biasing ring 30 has: 1) a first area 33 having a first radial thickness 33T and a first radially inward facing surface 33S; and 2) a second area 34 having a second radial thickness 34T and a second radially inward facing surface 34S. In one embodiment, the first radial thickness 33T is less than the second radial thickness 34T. In one embodiment, the first radial thickness 33T and the second radial thickness 34T are about equal. The first radially inward facing surface 33S has a first arcuate notch 31 (e.g., circular shaped notch) formed therein; and the second radially inward facing surface 34S has a second arcuate notch 32 (e.g., circular shaped notch) formed therein. The first arcuate notch 31 and the second arcuate notch 32 are circumferentially spaced apart from one another. In the embodiment shown in FIGS. 1A, 1B, 7A and 7B, the biasing ring 30 is a split ring having a gap G defined between circumferential ends 35A and 35B of the biasing ring 30. The biasing ring 30 is manufactured from a resilient material, for example a spring steel, to allow for radial movement of the ends 35A and 35B of the biasing ring 30, as described herein.

While the biasing ring 30 is described as being a split ring having a gap G and being manufactured from a resilient material to allow for radial movement of the ends 35A and 35B, the present invention is not limited in this regard as the biasing ring 30 may be of other configurations and materials including but not limited to a solid annular ring having areas of different modulus of compression and configurations including mechanical fixtures to selectively limit radial movement of portions of the biasing ring. For example, in one embodiment the first area 33 has a first modulus of compression and the second area 34 has a second modulus of compression. In one embodiment, the first modulus of compression is greater than the second modulus of compression. In one embodiment, the first modulus of compression is of a magnitude sufficient to allow radially outward displacement of the ball 20 in response to application of a torque to the collet 60 and the second modulus of compression is of a magnitude sufficient to restrain axially outward movement of the ball 20.

Referring to FIGS. 2A, 2B, 2C, 2D and 2E, a collet assembly is generally designated by the numeral 14. The collet assembly 14 has a locking mechanism 100 installed therein. The collet assembly 14 includes a mounting tube, for example, a collet adapter 70 that is generally tubular and has a generally circular cross section and generally circular exterior surface. As shown in FIGS. 2A, 2B, 2C, 2D, 3A, 3B and 3C, the collet adapter 70 has a first interior surface extending longitudinally inwardly from a first end 70A of the collet adapter 70 as best shown in FIG. 3B and that defines a first bore 70C. The collet adapter 70 has a second interior surface extending longitudinally inwardly from a front end 70B of the collet 60 and that defines a second bore 70D. A portion of the second bore 70D proximate the front end 70B has a tapered portion 70T. The first bore 70C is defined by an inside diameter D1 and the second bore 70D is defined by an inside diameter D2. The diameter D1 is less than the diameter D2. The first bore 70C transitions to the second bore 70D at a junction between the first bore 70C and the second bore 70D. The junction defines a shoulder 75. The first end 70A is configured to be secured to a structure (not shown), for example a machine such as a lathe. The front end 70B is configured to receive a collet 60 therein. While the collet adapter 70 is described as having a circular exterior surface, the present invention is not limited in this regard as the exterior surface of the collet adapter may be of any suitable shape, including rectangular, square or other shape configured to adapt to a structure or machine that the collet adapter is mounted in.

As best shown in FIGS. 3A, 3B and 3C, the collet adapter 70 has a radially outward facing exterior surface 70E that has a circumferential groove 73 formed therein. The circumferential groove 73 is located between the first end 70A and the second end 70B of the collet adapter 70. The circumferential groove 73 has a hole 71 radially extending through a web 70W defined by a base portion of the groove 73. The hole 71 extends into the second bore 70D proximate the shoulder 75. The web 70W has a radial thickness of WT that extends between side walls 73X and 73Y of the circumferential groove 73, the side walls 73X and 73Y being formed by the collet adapter 70, as shown in FIG. 2B and FIG. 3C. The collet adapter 70 has a second groove 72 formed on the second interior surface of the second bore 70D. The second groove 72 is spaced apart from the shoulder 75 by a distance slightly greater than or approximately equal to a width W71 of the first groove 71.

As shown in FIGS. 2C, 2D, 10A, 10B and 10C, the collet 60 has a generally cylindrical body portion 60L with a bulbous head portion 60H. A portion of the body portion 60L has an external threaded area 63 proximate a first end 60A of the collet 60. The threaded area 63 allows the collet 60 to be screwed into a machine specific pull mechanism (not shown) by rotating the collet 60 on a longitudinal axis thereof. While the threaded area 63 is shown as being an external thread, the present invention is not limited in this regard, as an internal area of the collet may be threaded for screwing into the machine specific pull mechanism or a quick change system may be employed.

The collet 60 is fabricated from spring steel or other suitable material and as shown in FIGS. 2C, 2D, 10A 10B and 10C the head portion 60H of the collet 60 has three slots 62 formed on a tool or work piece receiving end 60B to allow jaws 62J to be sufficiently flexible relative to each other to facilitate the constriction of a tool or work piece (not shown). The head portion 60H includes a tapered portion 60T that tapers radially outward from a junction with the body portion 60L and axially away from the body portion 60L. As shown in FIGS. 2C, 2D, 10A, 10B and 10C the collet 60 has a keyway 61 formed in an exterior surface of the body portion 60L, extending longitudinally from the first end 60A and terminating at a point 60D located between the first end 60A and the head portion 60H of the collet 60.

Referring to FIGS. 2A, 2B, 2C, 2D and 2E, the locking mechanism 100 is shown installed in the collet adapter 70. In particular, the inner ring 10 is disposed in the second bore 70D and is seated proximate to, for example abutting, the shoulder 75 and aligned with the circumferential groove 73. As shown in FIG. 2B, a split ring 40 (e.g., the split ring of FIGS. 8A and 8B) is disposed in the second groove 72 thereby removably securing the inner ring 10 in the second bore 70D between the shoulder 75 and the split ring 40. The body portion 60L of the collet 60 is positioned in the first and second bores 70C and 70D so that the tapered portion 60T of the collet 60 wedges against the tapered portion 70T of the collet adapter 70. The activation tab 11 extending from the inner ring 10 is positioned in the key-way 61 of the collet 60 so that the collet 60 is rotationally fixed relative to the inner ring 10. The detent member 20 (e.g., ball) is positioned in the hole 71. The diameter 20D of the ball 20 is larger than the radial thickness WT of the web 70W so that portions 20X and 20Y of the ball 20 protrude beyond opposing sides of the web 70W.

In the unlocked position illustrated in FIG. 2C, the portion 20X of the ball 20 is seated in one of the notches 12 of the inner ring 10 and the portion 20Y of the ball 20 is seated in the first arcuate notch 31 formed in the biasing ring 30. The biasing ring 30 urges the ball 20 radially inward into the notch 12 so that during operation of the collet assembly 14 there is no rotational movement between the collet 60 and the collet adapter 70.

Figure 5:
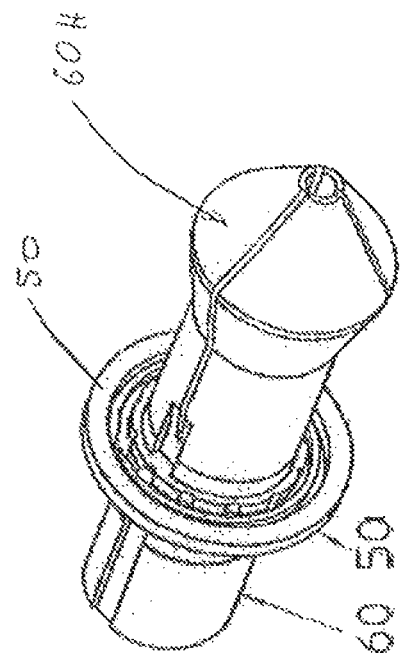
FIG. 5 is a perspective view of a collet with the locking mechanism of FIG. 1A positioned thereon and having a locking ring positioned therearound.
Figure 4:
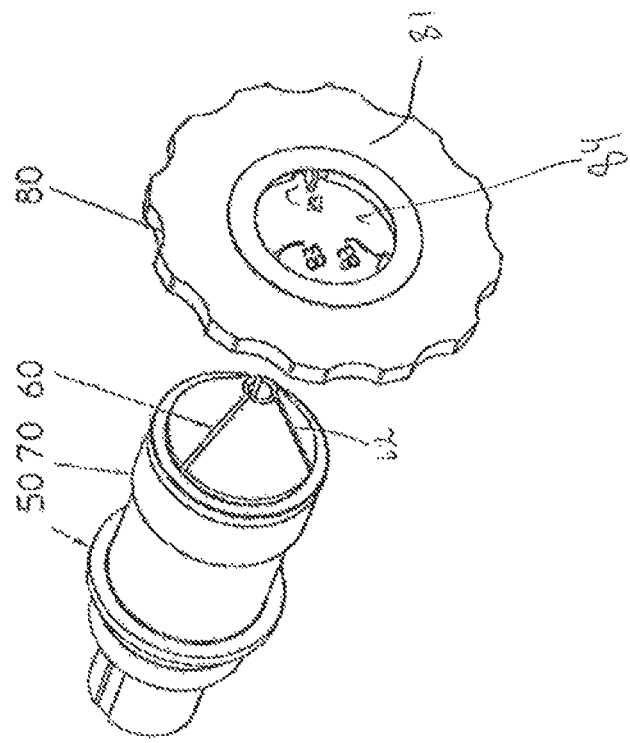
FIG. 4 is a perspective view of the collet assembly of FIG. 2A shown with a set-up key proximate thereto.

Referring to FIGS. 2A, 2B and 2C an outer ring 50, for example a lock ring 50 (e.g., the lock ring of FIGS. 5, 9A and 9B) is positioned around the biasing ring 30 to retain the biasing ring 30 in the groove 73 and between the side walls 73X and 73Y of the circumferential groove 73. In one embodiment, the lock ring is embedded in a machine to which the collet assembly 14 is adapted to. The outer ring 50 has an interior surface 50S defined by an inside diameter D50 (as shown in FIG. 9B) of the outer ring 50. Referring again to FIGS. 2A, 2B and 2C, the diameter D50 is sized and the outer ring 50 is positioned coaxially with the collet adapter 70 so that an annular space having a radial width W is formed between the interior surface 50S of the outer ring 50 and a radially outward facing surface 70S of the web 70W. The width W is greater than the first radial thickness 33T of the first area 33 of the biasing ring 30 thereby defining a space 39T1 between the interior surface 50S and a radially outward facing surface of the first area 33.

Figure 2D:
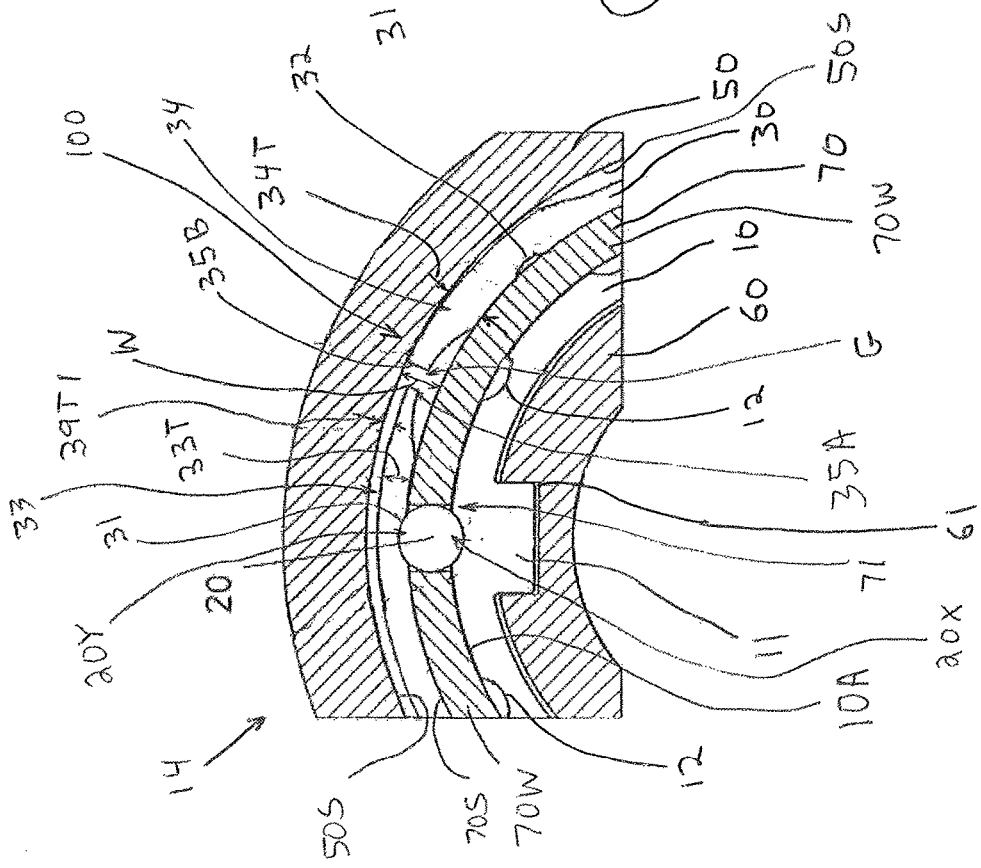
FIG. 2D is a cross sectional view of the collet assembly and locking mechanism of FIG. 2B shown in a locked position and taken across line II-II of FIG. 2B.
Figure 2E:
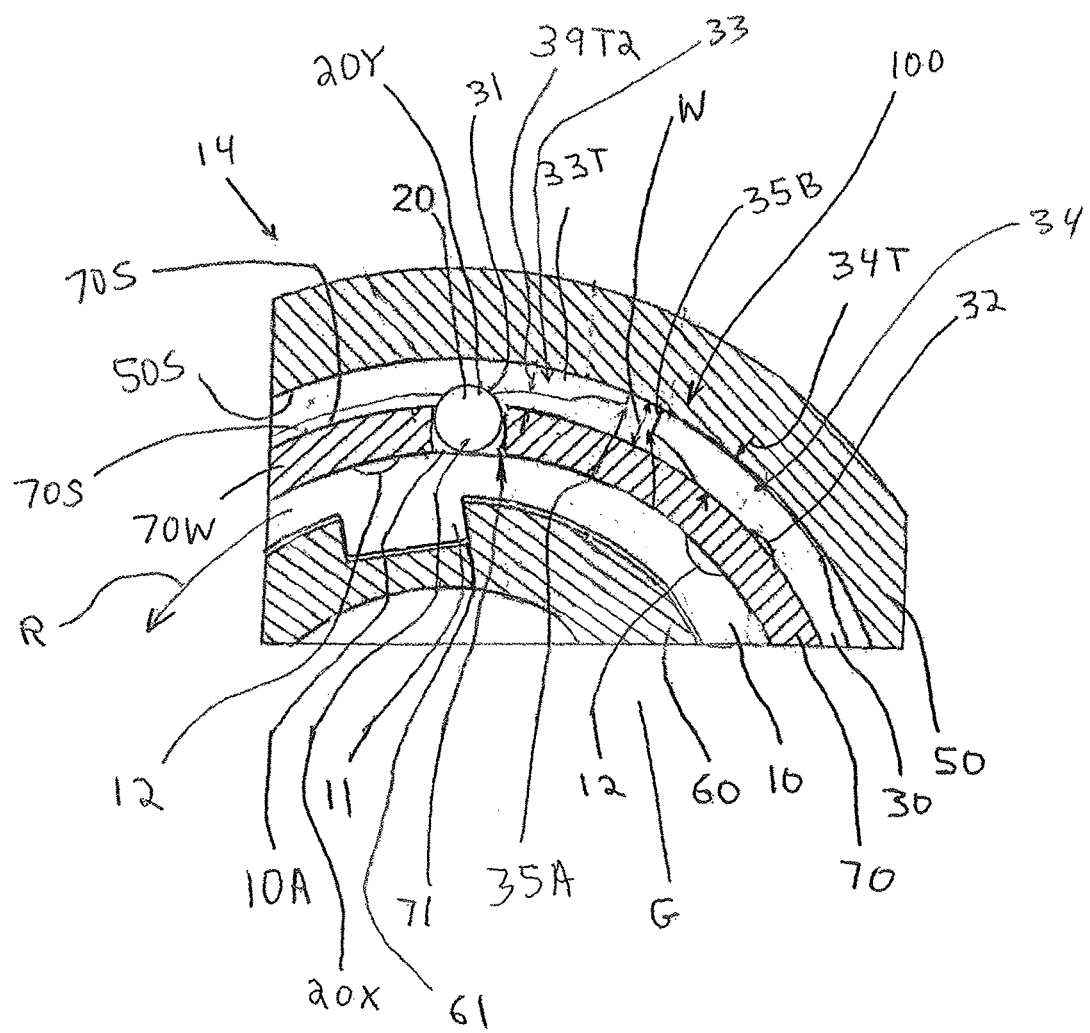
FIG. 2E is a cross sectional view of the collet assembly and locking mechanism of FIG. 2C with a detent member displaced axially outward.

The locking mechanism 100 is selectively positionable in an unlocked position shown in FIGS. 2C and 2E and a locked position as shown in FIG. 2D. The locking mechanism 100 is placed in the unlocked position by positioning the ball 20 in the first arcuate notch 31 as shown in FIG. 2C, while the outer ring 50 removed. The unlocked position is secured by positioning the outer ring 50 around the biasing ring 40. In the unlocked position, the collet 60 is rotatable relative to the collet adapter 70 in response to application of a first torque applied to the collet 60 during positioning. In the unlocked position, the collet 60 is fixed relative to the collet adapter 70 in response to a lesser operating torque applied to the collet 60 during operation, such as during a machining operation. The locking mechanism 100 is placed in the locked position by positioning the ball 20 in the second arcuate notch 32 as shown in FIG. 2D, while the outer ring 50 is removed. The locked position is secured by positioning the outer ring 50 around the biasing ring 40. In the locked position, the collet 60 is rotationally fixed relative to the collet adapter 70.

During positioning of the collet 60 in the collet adapter 70 while in the unlocked position shown in FIG. 2E, the collet 60 is caused to rotate, for example in the direction indicated by the arrow R, as described further herein. Rotation of the collet 60 causes the inner ring 10 to rotate with the collet 60 because of the engagement of the actuation tab 11 in the key-way 61 of the collet 60. Rotation of the inner ring 10 forces the ball 20 to move out of the notch 12 and to move radially outward into the space 39T1 (shown in FIG. 2C) and creating another space 39T2 between the radially outward facing surface 70S of the web 70W and a radially inward facing surface of the first area 33. Further rotation of the collet 60 in the direction of the arrow R causes another of the notches 12 to align with the ball 20 at which time the biasing member causes the ball 20 to rapidly snap into the next notch 12 thereby emitting an audible sound. Even further rotation of the collet 60 in the direction of the arrow R causes the ball 20 to sequentially move out of and back into subsequent notches 12 for a predetermined precise rotational positioning of the collet 60 in the collet adapter 70, depending on the circumferential location of the notches 12.

Thus when the ball 20 is positioned in the first arcuate notch 31, the ball 20 is selectively positionable in one or more of the notches 12. During installation of the collet 50 in a receiving structure (e.g., the collet adapter 70) or removal of the collet 60 from the receiving structure, the collet 60 is rotatable relative to and within the collet adapter 70 in predetermined radial steps, in response to a first torque applied to the collet 60.

Referring to FIGS. 4, 11A, 11B and 11C a set-key 80 that is configured to removably engage the collet head portion 60H and apply the first torque thereto. In particular, the set-key 80 includes a body portion 81 that has three tabs 83 extending radially inward therefrom and projecting into an opening 84 in the set-key 80. The tabs 83 are supported axially on one side of the set-key by a backing plate portion 82. The tabs 83 are positioned complementarily to the location of the slots 62 on the collet 60. The set-key 80 is positioned over the head portion 60H of the collet 60 so that the tabs 83 engage the slots 62 for transmittal of torque from the set-key 80 to the collet 60.

During operation of the collet 60 in the unlocked position as shown in FIGS. 2C and 2E, the collet 60 is retained relative to and within the collet adapter 70 in a predetermined position, in response to an operating torque applied to the collet 60.

During operation of the collet 60 in the locked position illustrated in FIG. 2D the ball 20 is secured in the second arcuate notch 32 and the notch 12. In the locked position, the second area 34 is restrained from radial movement because the thickness 34T thereof is about equal to the radial width W leaving no space for radial displacement of the second area 34 of the biasing ring 40. In the locked position, the ball 20 is positioned in the second arcuate notch 32 and is locked in one of the notches 12. In the locked position, the collet 60 is rotatably restrained relative to and within the collet adapter 70 and is axially slidable therein, during installation of the collet in a receiving structure and/or removal of the collet from the receiving structure.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A collet assembly comprising:
    a collet adapter having a first circumferential groove formed in a radially outward facing exterior surface defined by the collet adapter, the first circumferential groove extending axially between opposing side walls formed by the collet adapter, and the first circumferential groove having a hole extending radially therethrough;
    a biasing ring positioned in the first circumferential groove between the opposing side walls, the biasing ring having a first area having a first radial thickness and a second area having a second radial thickness, a first notch formed on a first radially inward facing surface defined by the first area and a second notch formed on a second radially inward facing surface defined by the second area, the first notch and the second notch being circumferentially spaced apart from one another;
    an inner ring having an activation tab extending therefrom and at least one third notch, each of the at least one third notches extending radially inward at a respective circumferential position along a radially outward facing surface defined by the inner ring;
    the biasing ring being positioned around the inner ring thereby defining a cavity therebetween, a portion of the collet adapter being positioned in the cavity; and
    a detent member positioned in the cavity and partially in the hole, the detent member being selectively engageable with at least one of the first notch, the second notch and the at least one third notch.

2. The collet assembly of claim 1, further comprising an outer ring positioned around the biasing ring.

3. The collet assembly of claim 1, wherein:
    the collet adapter has a first interior surface defining a first bore extending longitudinally through the collet adapter;
    the collet adapter has a second interior surface defining a second bore extending longitudinally through the collet adapter and having a diameter greater than the first bore and a shoulder formed at a junction of the first and second bores;
    the second interior surface having a second groove formed therein, the second groove having a split ring removably positioned therein; and
    the inner ring being axially restrained between the shoulder and the split ring.

4. The collet assembly of claim 1, wherein the second radial thickness is greater than the first radial thickness.

5. The collet assembly of claim 1, further comprising:
    a collet having a key-way formed axially in an exterior surface defined by the collet; and
    the tab positioned in the key-way.

6. The collet assembly of claim 5, wherein when the detent member is positioned in the first notch, the detent member is selectively positionable in the at least one third notch.

7. The collet assembly of claim 5, wherein during at least one of installation of the collet in a receiving structure and removal of the collet from the receiving structure, the collet is rotatable relative to and within the collet adapter in predetermined radial steps, in response to a first torque applied to the collet.

8. The collet assembly of claim 7, further comprising a set-key that is configured to removably engage the collet and apply the first torque thereto.

9. The collet assembly of claim 5, wherein during operation of the collet, the collet is retained relative to and within the collet adapter in a predetermined position, in response to an operating torque applied to the collet.

10. The collet assembly of claim 5, wherein when the detent member is positioned in the second notch, the detent member is locked in one of the at least one third notches.

11. The collet assembly of claim 5, wherein during at least one of installation of the collet in a receiving structure and removal of the collet from the receiving structure, the collet is rotatably restrained relative to and within the collet adapter and is axially slidable therein.

12. The collet assembly of claim 1, wherein the collet adapter has a first end configured to be secured to a structure and a front end opposite the first end, and the front end being configured to receive the collet.

13. The collet assembly of claim 1 wherein a portion of the inner ring extends radially outward beyond an interior surface of the collet adapter.

14. The collet assembly of claim 1, wherein the biasing ring has an axial split therein.

15. A collet assembly comprising:
    a collet adapter having a first circumferential groove formed in an exterior surface defined by the collet adapter and the first circumferential groove having a hole extending radially therethrough;
    a biasing ring positioned in the first circumferential groove, the biasing ring having a first area having a first radial thickness and a second area having a second radial thickness, a first notch formed on a first radially inward facing surface defined by the first area and a second notch formed on a second radially inward facing surface defined by the second area;
    an inner ring having an activation tab extending therefrom and at least one third notch formed in a radially outward facing surface defined by the inner ring;
    the biasing ring being positioned around the inner ring thereby defining a cavity therebetween, a portion of the collet adapter being positioned in the cavity; and
    a detent member positioned in the cavity and partially in the hole, the detent member being selectively engageable with at least one of the first notch, the second notch and the at least one third notch,
    wherein:
    the collet adapter has a first interior surface defining a first bore extending longitudinally through the collet adapter;

the collet adapter has a second interior surface defining a second bore extending longitudinally through the collet adapter and having a diameter greater than the first bore and a shoulder formed at a junction of the first and second bores;

the second interior surface having a second groove formed therein, the second groove having a split ring removably positioned therein; and the inner ring being axially restrained between the shoulder and the split ring.

16. A collet assembly comprising:

a collet adapter having a first circumferential groove formed in an exterior surface defined by the collet adapter and the first circumferential groove having a hole extending radially therethrough;

a biasing ring positioned in the first circumferential groove, the biasing ring having a first area having a first radial thickness and a second area having a second radial thickness, a first notch formed on a first radially inward facing surface defined by the first area and a second notch formed on a second radially inward facing surface defined by the second area;

an inner ring having an activation tab extending therefrom and at least one third notch formed in a radially outward facing surface defined by the inner ring;

the biasing ring being positioned around the inner ring thereby defining a cavity therebetween, a portion of the collet adapter being positioned in the cavity;

a detent member positioned in the cavity and partially in the hole, the detent member being selectively engageable with at least one of the first notch, the second notch and the at least one third notch;

a collet having a key-way formed axially in an exterior surface defined by the collet; and the activation tab positioned in the key-way.

* * * * *